United States Patent
Gerresheim et al.

(12)

(10) Patent No.: US 6,889,723 B2
(45) Date of Patent: May 10, 2005

(54) PREPARATION FOR SEALING PUNCTURED TIRES AND APPARATUS FOR THE SEALING AND PUMPING UP OF TIRES

(75) Inventors: Manfred Gerresheim, Obertshausen-Hausen (DE); Hans-Bernd Fuchs, Alzenau-Horstein (DE); Ulrich Steinbrecht, Ober-Ramstadt (DE); Norbert Stransky, Rodenbach (DE); Eduard Ditzel, Rodenbach (DE); Helmut Wolf, Grundau (DE)

(73) Assignee: Sumitomo Rubber Industries, Ltd., Kobe (JP)

( * ) Notice: Subject to any disclaimer, the term of this patent is extended or adjusted under 35 U.S.C. 154(b) by 321 days.

(21) Appl. No.: 10/072,903

(22) Filed: Feb. 12, 2002

(65) Prior Publication Data

US 2002/0121331 A1 Sep. 5, 2002

Related U.S. Application Data

(62) Division of application No. 08/677,119, filed on Jul. 9, 1996, now Pat. No. 6,454,892.

(30) Foreign Application Priority Data

Jul. 11, 1995 (DE) .......................................... 195 25 233
Dec. 8, 1995 (DE) .......................................... 195 45 935

(51) Int. Cl.$^7$ ............................................... B29C 73/02
(52) U.S. Cl. ...................... 141/38; 156/115; 156/394.1; 523/166
(58) Field of Search ............................. 156/115, 394.1; 152/503; 141/38; 222/372, 373, 399; 523/166

(56) References Cited

U.S. PATENT DOCUMENTS

| 2,308,960 | A | * | 1/1943 | Stevens ........................ 222/4 |
| 3,015,638 | A | | 1/1962 | Sergi |
| 3,727,651 | A | * | 4/1973 | Biever ........................ 141/231 |
| 3,843,586 | A | | 10/1974 | Wolf |
| 3,926,880 | A | | 12/1975 | Esser et al. |
| 3,976,606 | A | | 8/1976 | Gobran |
| 3,981,342 | A | | 9/1976 | Farber et al. |
| 4,116,895 | A | | 9/1978 | Kageyama et al. |
| 4,337,322 | A | | 6/1982 | Jaspon |
| 4,426,468 | A | | 1/1984 | Ornum et al. |

(Continued)

FOREIGN PATENT DOCUMENTS

| CH | 208111 | 6/1940 |
| CH | 286505 | 10/1952 |

(Continued)

OTHER PUBLICATIONS

Translation of EP 278297.
Derwent abstract for DE 3034908.
Derwent abstract for DE 3932278.
JP62–81480 A, Derwent Abstract #1987–141032.

Primary Examiner—Geofrey L. Knable
(74) Attorney, Agent, or Firm—Birch, Stewart, Kolasch & Birch, LLP

(57) ABSTRACT

A sealing preparation for tire problems is proposed which seals in wet conditions, at low and high temperatures and with defects at the transition between the tread and the side wall of the tire. The sealing preparation contains natural rubber latex or a combination of rubber latex and compatible adhesive resin. Furthermore, various devices are proposed for introducing the sealing preparation into the tire and for the pumping up. An air compressor, or liquefied dinitrogenoxide, or sulphur hexafluoride are preferably used with these devices as a pressure source.

22 Claims, 1 Drawing Sheet

U.S. PATENT DOCUMENTS

| | | | |
|---|---|---|---|
| 4,501,825 A | | 2/1985 | Magyar et al. |
| 4,539,344 A | | 9/1985 | Ornum et al. |
| 4,644,026 A | | 2/1987 | Shuman et al. |
| 4,969,493 A | * | 11/1990 | Lee .............................. 141/38 |
| 5,070,917 A | * | 12/1991 | Ferris et al. ................... 141/38 |
| 5,124,395 A | | 6/1992 | Abramowski et al. |
| 5,284,895 A | | 2/1994 | Gupta |
| 5,295,525 A | | 3/1994 | Sanda, Jr. |
| 5,834,534 A | * | 11/1998 | Adams et al. ............... 523/166 |

FOREIGN PATENT DOCUMENTS

| | | |
|---|---|---|
| DE | 2749192 | 5/1978 |
| DE | 3034908 A1 | 4/1982 |
| DE | 3842344 | 6/1990 |
| DE | 3932278 | 4/1991 |
| EP | 0278297 A1 | 8/1988 |
| EP | 688843 | 12/1995 |
| FR | 671659 | 12/1929 |
| FR | 932409 | 3/1948 |
| FR | 1016016 | 10/1952 |
| FR | 1072149 | 9/1954 |
| FR | 1303791 | 10/1961 |
| NL | 627842 | 3/1936 |
| OA | 252720 | 6/1911 |

* cited by examiner

PREPARATION FOR SEALING PUNCTURED TIRES AND APPARATUS FOR THE SEALING AND PUMPING UP OF TIRES

This is a Division of application Ser. No. 08/677,119 filed Jul. 9, 1996 now U.S. Pat. No. 6,454,892 which was issued Sep. 24, 2002.

This invention relates to a preparation for sealing punctures in tires and also to an apparatus for the application of the sealing preparation to the tire and for pumping it up to a pressure at which it can be used.

BACKGROUND OF THE INVENTION

Various puncture sealing preparations are available on the market. They mainly contain colloidal dispersions of polymers in an aqueous medium, known in the following as lattices. Thus, for example polystyrene butadiene lattices, poly (vinyl acetate) lattices, acrylic copolymer lattices, nitrile lattices and polychloroprene lattices are used. Sealing preparations are also known which do not contain water but rather tetrachloroethylene as the carrier medium.

The prior art uses, for the introduction of such sealing preparations into a tire and for pumping up the tire to a pressure at which it can be used, an apparatus comprising a pressure-tight container for the sealing preparation which contains a liquefied gas as a pressure source. This is referred to as a spray can in the following. A propane/butane mixture is mainly used as the liquefied gas. In rare cases, fluorochlorohydrocarbons are also used. These spray cans have a hose at their outlet valve, the other end of the hose being provided with a screw adapter for the tire valve.

When a tire puncture occurs, the sealing preparation is sprayed from the spray can into the interior of the tire through the tire valve and the tire is reinflated by means of the propellant gas to a specific pressure which is of different levels depending on the leak. The tire is then driven a few kilometers, dependent on the nature of the defect, to distribute the sealing preparation in the interior of the tire and to seal off the defect.

In another apparatus, the sealing preparation is located in a compressible flask which is connected via an adapter to the tire valve with the valve insert having been previously removed. The sealing preparation is then sprayed into the tire by pressing the flask. After the insertion of the valve insert, the tire is then pumped up again to a specific pressure with the aid of carbon dioxide cartridges.

The previously used sealing preparations are not completely satisfactory. They can be mechanically removed relatively easily, some of them are not adequately effective in wet conditions and do not result in a seal when the tire defect is present at the edge of the breaker, i.e. at the edges of the tire treads.

Difficulties also arise with the prior art apparatus for introducing the sealing preparation into the interior of the tire and for pumping up the tire. Thus, with spray cans which contain propane/butane mixtures as the propellant gas, one can, depending on the mixture ratio, only satisfactorily operate to temperatures down to about 0° C. Furthermore, propane/butane mixtures are combustible and explosive. Fluorochlorohydrocarbons are a burden for the environment. Finally all known propellants are only available in a limited quantity when a puncture occurs.

SUMMARY OF THE INVENTION

The object of the present invention is to provide a sealing preparation which results in an effective seal even in the wet and also for punctures at the edge of the breaker strips and which is mechanically more difficult to remove. Furthermore, devices are provided for the successful introduction of the sealing preparation into the tire and for the pumping up of the tire to a pressure at which the tire can be used and which do not have at least one of the above-named disadvantages.

According to one aspect of the present invention, a preparation for sealing a tire with a puncture comprises natural rubber latex. Preferably, the sealing preparation of the invention contains, apart from the natural rubber latex, an adhesive resin compatible with the rubber latex.

Such sealing preparations result in substantially better sealing than the prior art commercially available sealing preparations. The sealing preparations of the invention are more difficult to mechanically remove from the tire, seal better under wet conditions and result in a good seal, even for punctures at the edge of the breaker strip.

For the adhesive resin, "compatible" signifies that the adhesive resin does not cause any coagulation of the rubber latex. As adhesive resins, there are to be understood resins which improve the ability of the rubber latex to bond to the tire. By way of example, resins can be used which are added to elastomers as tackifiers. The adhesives resins are preferably added in the form of aqueous dispersions or emulsions of rubber latex. A a rule, these are aqueous dispersions. Particularly preferred are terpenephenol-resins.

Latex which has been concentrated by centrifuging or vaporization can also be used as natural rubber latex.

In the embodiment without the addition of adhesive resin, a part of the natural rubber latex can be replaced by lattices of synthetic rubbers, such as for example styrene butadiene rubber, acryl nitrile butadiene rubber, ethylenevinylacetate rubber, chloroprene rubber, vinylpyridene rubber, butyl rubber and others as well as their mixtures. The content of natural rubber latex then amounts to 10 to 80R by weight, in particular to 40 to 60% by weight of the rubber latex. The sealing preparation preferably contains only natural rubber latex as the rubber latex.

In the embodiment in which an adhesive resin is contained in the sealing preparation, lattices of natural rubber and of synthetic rubbers, such as, for example, styrene butadiene rubber, acryl nitrile butadiene rubber, ethylenevinylacetate rubber, chloroprene rubber, vinylpyridene rubber, butyl rubber and others can be used as well as their mixtures. Preferred are mixtures of natural rubber with the said lattices of synthetic rubbers and it is particularly preferred if only natural rubber latex is contained as rubber latex in the sealing preparation.

The sealing preparations of the invention can be used for the sealing of pneumatic tires of all types, including bicycles, motorcycles, motorcars, commercial vehicles, industrial vehicles, wheelchairs, caravans, agricultural and garden vehicles, wheelbarrows, and so on.

In the sealing preparations of the invention , which contain an adhesive resin, the ratio by weight of rubber to adhesive resins preferably lies in the range from about 10:1 to 1:10, more preferably from 5:1 to 1:3 and particularly preferably from 4:1 to 1:1.

A frost protection agent is preferably added to the sealing preparations of the invention. Customary frost protection agents can be used, such as high boiling point, water soluble, difficult to ignite organic liquids, such as glycols, preferably ethylene glycol. Polyethylene glycols with molecular masses up to 300 to 400 g/mol can also be used. Through this addition, one obtains a good sealing at low temperatures, even when these are associated with the effects of wetness.

For the thinning of the sealing preparations, a dispersion agent can be used, as a rule, water. Furthermore, the sealing preparations of the invention can contain customary dispersants, emulsifying agents, foam stabilizers and/or pH-regulators, such as ammonia or sodium hydroxide. Moreover, it can be of advantage for rapid sealing and for the sealing of larger holes to use one or more fillers. Suitable fillers are, for example, silicic acid, chalk, carbon black, fibrous materials, such as natural fibers, chemical fibers of natural polymers or synthetic fibers, glass fiber reinforced plastics, polystyrene particles, rubber dust which is produced by comminution of vulcanized products such a tires, saw dust, moss rubber particles, particles of rigid foam for cut flowers and the like. Particularly preferred are fibrous materials, small rubber particles in combination with silicic acids and glass fiber reinforced plastics.

The fillers can be directly added to the sealing preparation. However, insofar as the fillers have a size which would make it difficult or impossible to introduce the sealing preparation via the valve without a change in the valve size, these fillers are generally to be introduced into the tire during the fitting of the tire, they then bring about the seal when the sealing preparation is injected into the tire in the event of a puncture.

The solid component of the sealing preparation of the invention can amount to approximately 40 to 70% by weight, preferably to 45 to 55% by weight, and particularly preferably to about 50% by weight of the sealing preparation. With the sealing preparation without adhesive resins, the solid component comprises principally rubber. With the sealing preparation with adhesive resin, the solid material component additionally contains the resin, providing it is a solid resin. The liquid component of the sealing preparation without adhesive resins consists of the carrier agent water for the rubber, and optionally of further liquid components, such as the frost protection agent and the dispersion agent used for thinning, preferably water. With the sealing preparation with the adhesive resin, the dispersion agent or emulsifying agent for the adhesive resin, preferably water, also belongs to the liquid component as does, if necessary, the liquid adhesive resin.

If fillers are used, then they are added to the sealing preparation in a quantity of about 20 to 200 g per liter of sealing preparation, preferably 60 to 100 g, or are put in the tire during fitting.

The manufacture, storage and filling of the sealing preparation in accordance with the invention preferably takes place in the presence of nitrogen or noble gases in order to avoid the action of oxygen.

Various apparatuses can be used for the sealing preparation of the invention for the introduction of the sealing preparation into the tire and for pumping up of the tire. Thus, the sealing preparation can be used in the initially named spray cans which contain propane/butane mixtures as propellant gas. However, other preferred apparatuses can also be used according to a second aspect of the present invention.

Accordingly, a second aspect of the invention provides an apparatus wherein the pressure source is a liquefied gas which is contained with the sealing preparation in the pressure-tight container.

Thus in use, one embodiment provides a hose with a screw adapter for the tire valve which is attached to the outlet valve of the pressure-tight container. A liquefied gas which is contained with the sealing preparation in the pressure-tight container serves as the pressure source. Because the liquefied gas, for example a propane/butane mixture, is not capable of operating at low temperatures and/or the sealing preparation freezes, then the content of the pressure-tight container, that is to say the spray can, is heated up with the heat source to ensure effective operation.

The same method is used in the following embodiment. The pressure course is located outside the pressure-tight container, separate from the sealing preparation and can, for example, be an air compressor or a pressure flask or several gas cartridges with liquefied or compressed gas. With this embodiment, the pressure-tight container has a gas inlet through which the gas from the pressure flask or from the gas cartridge, or compressed air from the compressor, is introduced into the pressure-tight container. For the purpose, a hose-like connection is provided if required, with a pressure relief valve and a throughflow restrictor between the gas inlet of the pressure-tight container and the pressure flask of the air compressor.

In the case of a puncture, the sealing valve in the pressure-tight container is heated up by the heat source, insofar as it has frozen up, as was described above for the spray can. The pressure-tight container is connected to the tire valve via a hose with a screw adapter connected to the outlet valve of the pressure-tight container. Through the gas introduced from the pressure flask or from the compressor into the pressure-tight container, the sealing preparation is sprayed via the outlet valve and the hose into the interior of the tire. Insofar as the gas in the pressure flask is not capable of operating at low temperatures, the pressure flask can also be heated up by a heat source.

The embodiment with the pressure as the pressure source has the additional advantage that an unrestricted gas supply is available. When compared with propane/butane mixtures, the further advantage is obtained, that no danger exists of combustion or explosion. Small air compressors for pumping up motorcar and motorcycle tires are commercially available. They are designed for pressures up to approximately 12 bar. Naturally, compressors with a lower and higher maximum pressure and also with a lower or higher air conveying volume can be used in the devices of the invention. The compressors can be connected to the cigarette lighter, directly to the battery in the motor vehicle or to another power source.

A heater pad with resistive heating can be used as the heat source and may be wound or laid around the pressure-tight container and/or the pressure flask of the liquefied gas. The heater can also be supplied with power via the cigarette lighter.

Furthermore, the heat source can consist of at least two mutually separated substances which, on mixing, liberate heat of reaction, such as for example heat of neutralization, heat of solution or heat of hydration. Thus, if required, calcium chloride, by way of example, can be dispensed into a water containing pad or cushion which is, for example, wound around the pressure-tight container or the pressure flask to be heated up. Through the heat of hydration, the sealing preparation and/or the propellant can be heated up to a temperature at which they are capable of functioning. Naturally, other devices can also be used in place of the cushion, for example, an upwardly open vessel with a jacket filled with water in which the pressure-tight container or the pressure flask which has to be warmed up is placed as required.

A latent heat source which liberates heat on its conversion can also be used as a heat source. In this case, a cushion can also be considered which contains the latent heat source. Substances, which generate heat with a change of the state of aggregation or on phase transitions, can be used as the latent heat source. Thus, for example, cushions can be used which contain a sodium acetate solution. On pressing a metallic platelet, which is likewise contained in the cushion, the sodium acetate crystallize and the heat of crystallization is liberated.

In another embodiment, the apparatus has a pressure-tight container which is provided with an outlet valve and an outlet quantity restrictor and which contains a sealing preparation and liquefied sulphur hexafluoride or dinitrogenoxide as a pressure source for the introduction of the sealing preparation out of the pressure-tight container into the interior of the tire an also for the reinflation of the tire.

In this case, pressure-tight containers are used which withstand higher operating pressures than those for propane/butane mixtures. Whereas commercial spray cans which have a maximum permitted operating pressure of about 8 to 18 bar can be used with propane/butane mixtures, a pressure-tight container which is suitable for 25 bar operating pressure is used with sulphur hexafluoride, for example a thick-walled stainless steel container.

For dinitrogenoxide, the pressure-tight container must be suitable for operating pressures of about 50 bar. These propellants have the advantage that they are not combustible and can also be used at low temperatures without the aid of a heat source.

The manner of operation is the same as in a spray can. In this can, the outlet valve is also provided with a hose which has a screw adapter for the tire valve at its end. In addition, an outlet quantity restrictor is provided at the outlet valve in order to be able to effect metering of the sealing preparation at high pressures.

With another embodiment in accordance with the invention, the apparatus has a pressure-tight container containing sealing preparation and having an outlet valve for the sealing preparation and also a gas inlet to which a pressure source can be connected or is connected from which pressurized gas can be introduced into the pressure-tight container via the gas inlet. An air compressor or a portable pressure vessel of about 5 to 8 liter volume which contains the air in compressed form can be used as the pressure source. The internal pressure of the tank amounts to about 8 to 10 bar. The pressure tank can, for example, be filled up at an air line at a filling station. Furthermore, a pressure flask or several gas cartridges with liquefied or compressed gas can be used as the pressure source. Propane/butane mixtures, sodium hexafluoride, dinitrogenoxide and others can also be used as gases.

The sealing preparation of the invention is preferably used in all the previously described apparatuses.

When a puncture occurs, the pressure-tight container is connected to the tire valve. For this purpose, the screw adapter which is located at the end of the hose connected to the outlet valve of the pressure-tight container is screwed onto the tire valve. Insofar as a sealing preparation and/or a gas, designated a propellant gas in the following, are used which are not capable of operation at low temperatures, and if the tire must be sealed at such temperatures, then the pressure-tight container which contains the sealing preparation and the propellant gas, or the pressure-tight container containing only the sealing preparation and the pressure flask with the propellant gas, can be brought to an operating temperature with the aid of a previously described heat source. This heating up can also be carried out prior to connecting the tire valve and the pressure-tight container.

On opening of the outlet valve, the sealing preparation is sprayed into the interior of the tire by the propellant gas which is either located in the pressure-tight container or is supplied to the pressure-tight container via its inlet valve from the flask and the tire is pumped up to a pressure which depends on the size of the leak. In the embodiment with an air compressor or pressure tank as a pressure source, air is supplied to the pressure-tight container via its inlet valve on opening of the outlet valve in order to spray the sealing preparation into the interior o the tire to pump up the tire. Thereafter, the apparatus is unscrewed from the tire valve and the tire is driven for a few kilometers so that the sealing preparation is distributed around the interior of the tore and the leak is sealed off. Thereafter, the apparatus is again connected to the tire valve and again the tire is pumped up to its desired pressure by the propellant gas which is either present in the pressure-tight container or is supplied to it from the pressure flask via the inlet valve. Instead of using a pressure flask, several gas cartridges can also be used as a pressure source in order to obtain the desired pressure. With the device with an air compressor or pressure tank, the tire is pumped up to it desired pressure with air which is supplied to the tire via the pressure-tight container. With bicycles, an air pump can also be used.

Depending on the power of the compressor and depending on the nature and size of the tire defect, the pumping up process can also be omitted after sealing.

BRIEF DESCRIPTION OF THE DRAWINGS

The invention will now be described in more detail with reference to the drawings and to the embodiment. In the drawings there are shown.

DETAILED DESCRIPTION OF THE EMBODIMENTS

Figure 1:
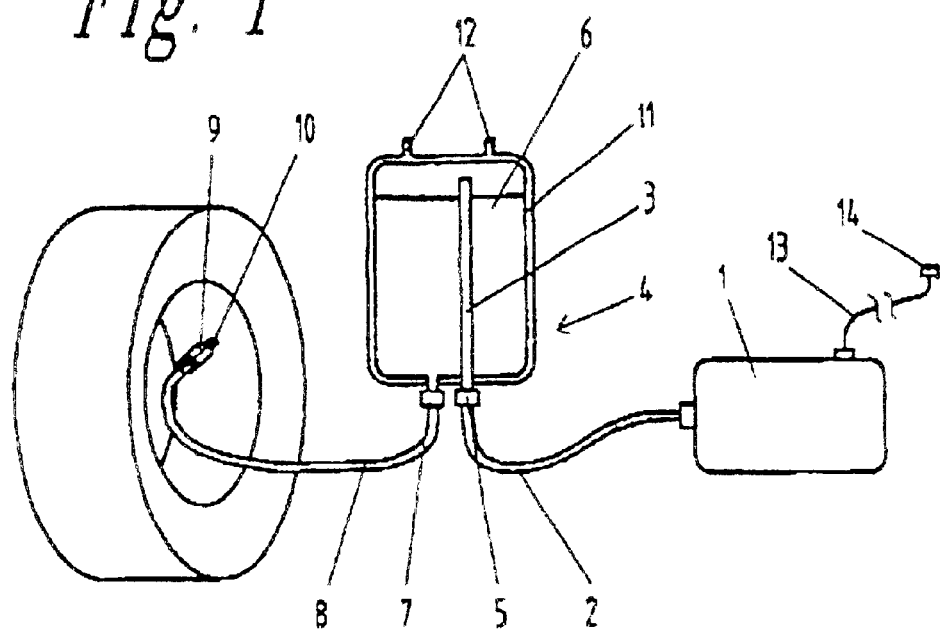
FIG. 1 a schematic illustration of an embodiment in accordance with the invention in which the pressure-tight container is shown in section.

The embodiment shown in FIG. 1 operates with a small air compressor 1 as a pressure source. The air compressor is connected via the hose 2 to the gas inlet 3 of the pressure-tight container 4. The gas inlet 3 is closable via a shut-off valve 5 and formed as a riser tube which extends above the liquid level of the sealing preparation 6 in the pressure-tight container 4. The pressure-tight container 4 is furthermore provided with an outlet valve 7 for the sealing preparation 6. A hose 8 is connected to the outlet valve 7 and carries at its end a threaded adapter 9 with which the hose 8 can also be screwed onto the tire valve 10.

The pressure-tight container is provided with a water-filled jacket 11 which has filling stubs 12. Calcium chlorine can be filled into this filling stub 12 as required. If the sealing preparation has frozen up at lower temperature, then it can be heated up in this way, by the heat of hydration which is liberated, to a temperature at which it is able to operate. The air compressor 1 is provided with an electrical cable 13, the plug 14 of which fits into the cigarette lighter.

When there is a puncture, the screw adapter 9 is screwed onto the tire valve 10, the air compressor is connected to the cigarette lighter and the shut-off valve 5 at the gas inlet of the pressure-tight container 4 is opened. The compressed air introduced via the gas inlet 3 into the container 4 presses the sealing preparation 6 through the outlet valve 7 and the tire valve 10 into the tire interior. Thereafter, the air flows into the interior of the tire and pumps the tire up to a specific pressure. Thereafter, the screw adapter 9 is unscrewed from the tire valve 10 and the air compressor 1 is stopped. After the tire has been run to distribute the sealant in the tire and for the sealing of the same, the device is reconnected and the tire is pumped up again to its desired pressured.

Figure 2:
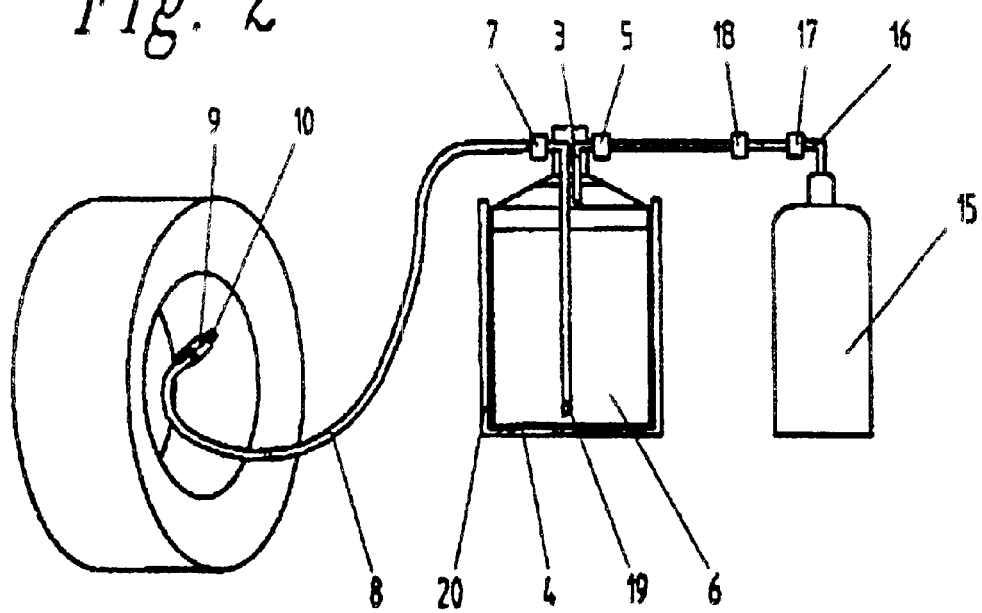
FIG. 2 a schematic illustration of another embodiment in accordance with the invention in which the pressure-tight container is shown in section.

FIG. 2 shows another embodiment in which parts identical to FIG. 1 are designated with the same reference numerals. In this device, a pressure flask 15 is provided at the pressure source and contains dinitrogenoxide or sulphur hexafluoride as the propellant gas. The pressure flask with the liquefied propellant gas is provided with a gas outlet 16 in which are located a shut-off valve 17, by which the throughflow quantity of the propellant as can be simultaneously set, and also a pressure relief valve 18. The gas outlet 16 is connected to the gas inlet 3 at the pressure-tight container 4. The outlet valve 7 for the sealing preparation 6 is connected to a riser tube 19. Furthermore, the pressure-tight container 4 stands in a vessel 20, the wall of which is filled with water or can be filled with water to which calcium chloride can be added if required in order to heat up the sealing preparation 6.

The manner of operation of this embodiment corresponds to that of FIG. 1 with the exception that the propellant gas flows into the pressure-tight container 4 on opening of the shut-off valve 17 and presses the sealing preparation 6 through the riser tube 19, the outlet valve 7 and the tire valve 10 into the tire. Naturally, a jacket 11 at the pressure-tight container 4 which can be filled with water and also the vessel 20 in FIG. 2 can be dispensed with when the sealing preparation 6 does not freeze up at low temperatures.

EXAMPLE 300 g of natural rubber latex with a rubber content of 60% by weight which contains ammonia as a pH-regulator were mixed by stirring with 120 g of terpen phenol resin dispersion with a resin content of 55% by weight (Dermulsene®). 67 g of ethylene glycol was added to the mixture and all was mixed well. The solid component of the mixture amounted to 246 g.

This mixture was tested in a device, such as can be seen in FIG. 1 with the exception that the pressure-tight container had no jacket to be filled with water, since the sealing preparation is also capable of operating at low temperatures.

The sealing preparation was tested under various test conditions. For the test, a 195/65 R12 DUNLOP® SP9 tire was used which was tested on a testing drum and on the road.

The testing drum was a CFM machine with a drum diameter of 2 m and a test load of 500 daN. The type and location of the defect and the more detailed test conditions at which the tire was tested with the two sealing preparations are set forth in the following Table 1.

During the road test an Audi Quattro A4 with a 2.8 1 engine was used. More precise details of the test conditions are likewise given in Table 1.

For the comparison, the best sealing preparation available on the market was used which contains chloroprene as rubber, water as a carrier agent and propane, butane as a propellant in a spray can.

The test results are summarized in the following Table 1.

The invention being thus described, it will be obvious that the same may be varied in many ways. Such variations are hot to be regarded as a departure from the spirit and scope of the invention, and all such modifications as would be obvious to one skilled in the art are intended to be included within the scope of the following claims.

TABLE 1

| Defect | Location of test | Weather conditions | Test speeds | Test distance | Sealing preparation | Results |
|---|---|---|---|---|---|---|
| 4 mm spike in the tread surface | CFM-machine | Dry | 50 km/h | 20 km | Example | Sealed |
|  |  |  |  |  | Commercial product | Sealed |
| 4 mm spike in the tread surface | CFM-machine | Wet | 50 km/h | 20 km | Example | Sealed |
|  |  |  |  |  | Commercial product | Sealed |
| 4, 5 mm screw in the undertread rubber run-out | Road test | Dry | Various speeds | 40 km (only in the example) | Example | Sealed |
|  |  |  |  |  | Commercial product | No seal |
| 4, 5 mm screw in the undertread rubber run-out | Road test | Wet | Various speeds | 40 km (only in the example) | Example | Sealed |
|  |  |  |  |  | Commercial product | No seal |
| 4 mm spike in the undertread rubber run-out, water in the tire | Road test | Dry | Various speeds | 40 km (only in the example) | Example | Sealed |
|  |  |  |  |  | Commercial product | No seal |
| 4 mm spike in the undertread rubber run-out | Road test | Dry | Various speeds | 40 km (only in the example) | Example | Sealed |
|  |  |  |  |  | Commercial product (double quantity) | Only initial seal |

The sealing preparation of the invention was additionally tested under the test conditions summarised in the Table 2 and in each case a seal was achieved.

TABLE 2

| Defect | Location of test | Test conditions |
|---|---|---|
| 4 mm spike in the tread surface | CFM-machine | Fast-running test at 170 km/h; camber 4° |
| 4 mm spike in the tread surface | CFM-machine | Fast-running test at 260 km/h, 3'; camber 4° |
| 4 mm spike in the tread surface | CFM-machine | Fast-running test at 250 km/h, 4'; camber 4° |
| 4 mm spike in the tread surface | CFM-machine | Speed: 100 km/h Test distance: 2796 km |
| 4 mm spike in the tread surface | CFM-machine | Speed: 100 km/h Test distance: 2400 km; camber 4° Oblique running: 1° |

The sealing preparation of the invention can be used at high and low temperatures.

What is claimed:

1. An apparatus for the sealing of punctures in and pumping up of a tire comprising:
   a pressure-tight container having an outlet valve and containing a sealing preparation
   comprising natural rubber latex and an adhesive resin compatible with the natural rubber latex;
   a source of pressure for introducing the sealing preparation from the pressure-tight
   container into an interior of the tire and for pumping up the tire; and
   a source of heat for heating up the sealing preparation in the pressure-tight container and/or for heating up of the pressure source.

2. The apparatus of claim 1, wherein the source of pressure comprises a liquefied gas that is contained with the sealing preparation in the pressure-tight container.

3. The apparatus of claim 1, wherein the pressure-tight container has a gas inlet and the pressure source comprises an air compressor with which air under pressure can be introduced via the gas inlet into the pressure-tight container.

4. The apparatus of claim 1, wherein the pressure-tight container has a gas inlet and the source of pressure comprises at least one pressure bottle that contains liquefied or compressed gas that can be introduced via the gas inlet into the pressure-tight container.

5. The apparatus of claim 1, wherein the heat source comprises a heated cushion with resistance heating.

6. The apparatus of claim 1, wherein the heat source comprises at least two substances separated from one another and that release reaction heat when mixed.

7. The apparatus of claim 1, wherein the heat source is a latent heat store that releases heat when it is converted.

8. An apparatus for sealing punctures in and pumping up a tire comprising:
   a pressure-tight container containing a sealing preparation comprising natural rubber latex and an adhesive resin compatible with the natural rubber latex and also containing liquefied sulfur hexafluoride as a pressure source for introducing the sealing preparation out of the pressure-tight container into an interior of the tire and also for the pumping up of the tire;
   an outlet valve for the sealing preparation; and
   an outlet quantity restrictor.

9. An apparatus for sealing punctures and pumping up a tire comprising:
   a pressure-tight container containing a sealing preparation comprising natural rubber
   latex and an adhesive resin compatible with the natural rubber latex;
   an outlet valve for the sealing preparation;
   a gas inlet; and
   a pressure source with which the gas under pressure can be introduced into the pressure-tight container via the gas inlet.

10. The apparatus of claim 9, wherein the pressure source is an air compressor.

11. The apparatus of claim 9, wherein the pressure source comprises at least one pressure bottle with liquefied or compressed gas.

12. An apparatus for the sealing of punctures and pumping up of tires, comprising a pressure-tight container containing a sealing preparation, the container having an outlet valve for the sealing preparation, a source of pressure for introducing the sealing preparation from the pressure-tight container into the interior of the tire and for the reinflation of the tire, said apparatus also comprising a source of heat for heating up the sealing preparation in the pressure-tight container and/or for the heating up of the pressure source and wherein the pressure-tight container contains a sealing preparation comprising a natural rubber latex, an adhesive resin compatible with the rubber latex, and a freezing protection agent, the solid content of said sealing preparation being in the range of 45% to 55% by weight of the total preparation and the weight ratio of rubber latex to adhesive resin being 4:1 to 1:1.

13. An apparatus in accordance with claim 12, wherein the pressure source is a liquefied gas which is contained with the sealing preparation in the pressure-tight container.

14. A apparatus in accordance with claim 12, wherein the pressure-tight container has a gas inlet and the pressure source is an air compressor with which air under pressure can be introduced via the gas inlet into the pressure-tight container.

15. An apparatus in accordance with claim 12, wherein the pressure-tight container has a gas inlet and the pressure source comprises at least one pressure bottle which contains a liquefied or compressed gas which is introducable via the gas inlet into the pressure-tight container.

16. An apparatus in accordance with claim 12, wherein the heat source is a heated cushion with resistance heating.

17. An apparatus in accordance with claim 12, wherein the heat source has at least two substances separated from one another which release heat when mixed.

18. An apparatus in accordance with claim 12, wherein the heat source is a latent heat store which releases heat when it is converted.

19. An apparatus in accordance with claim 12 for the sealing off of and pumping up of tires with tire troubles comprising a pressure-tight container which is provided with (a) an outlet valve for the sealing preparation contained in said container, and (b) an outlet quantity restrictor for the sealing preparation, and (c) liquefied sulphur hexafluoride as the pressure source for the introduction of the sealing preparation out of the pressure-tight container into the interior of the tire and also for the pumping up of the tire.

20. An apparatus in accordance with claim 12 for the sealing off of and pumping up of tires with tire troubles comprising a pressure-tight container containing a sealing preparation and having an outlet valve for the sealing preparation and also a gas inlet, and a pressure source with which gas under pressure can be introduced into the pressure-tight container via the gas inlet which can be closed by a shut-off valve.

21. An apparatus in accordance with claim 20, wherein the pressure source is an air compressor.

22. An apparatus in accordance with claim 20, wherein the pressure source is at least one pressure bottle with liquefied or compressed gas.

* * * * *